United States Patent [19]

Brown et al.

[11] Patent Number: 4,498,948
[45] Date of Patent: Feb. 12, 1985

[54] BEAD LOCKING DEVICE OF A TIRE BUILDING DRUM

[75] Inventors: Robert L. Brown; Virgil E. Henley; Stephen J. Kovalchik, all of Akron, Ohio

[73] Assignee: GenCorp Inc., Akron, Ohio

[21] Appl. No.: 525,858

[22] Filed: Aug. 24, 1983

[51] Int. Cl.³ .............................................. B29H 17/22
[52] U.S. Cl. .................................. 156/401; 156/132; 156/414
[58] Field of Search ............... 156/414, 401, 398, 400, 156/394.1, 133, 131, 132, 421.4

[56] References Cited

U.S. PATENT DOCUMENTS

| | | | |
|---|---|---|---|
| 3,871,942 | 3/1975 | Henley et al. | 156/401 X |
| 4,087,306 | 5/1978 | Head et al. | 156/132 X |
| 4,324,604 | 4/1982 | Alexander et al. | 156/401 X |

Primary Examiner—William A. Powell
Assistant Examiner—Thomas Bokan

[57] ABSTRACT

A tire building drum is described as having a unique mechanism for controlling the radial movement of the bead lock segments which are designed to hold the tire bead rings firmly, in position, during the tune-up operation. The mechanism includes an annular support member which is disposed concentrically around the longitudinal center axis of the drum adjacent opposing ends of the drum, and which has a number of raceways that are radially oriented in relation to said center axis. The raceways are equally, angularly spaced about said axis and are designed to slidably receive a bead lock segment on which a cam roller is freely mounted for rotation. The mechanism also includes an annular scroll member which is disposed concentrically around said axis in side-by-side parallel relation with each of the support members. Each of the scroll members is rotatable about said axis and has a grooved trackway which spirals around said axis at least one and one-half times and which is designed to receive the cam rollers which project from the adjacent bead lock segments. It can be appreciated that the segments will be forced to move in radial directions in response to rotation of the scroll members. The mechanism further includes any suitable device, such as a pair of pistons reciprocative, in unison, in separate annular bores concentric about said axis, for rotating the scroll members, in unison, to simultaneously move the bead lock segments in equal radial distances to and from the center axis of the drum.

16 Claims, 8 Drawing Figures

BEAD LOCKING DEVICE OF A TIRE BUILDING DRUM

BACKGROUND OF THE INVENTION

The invention broadly relates to tire building machinery, and specifically to a device that is provided at each of the opposing ends of a tire building drum to engage and hold a pair of tire bead rings, in position, as the ply endings of one or more unvulcanized carcass plies, layered on the drum, are turned up and reversely wrapped around the bead rings to anchor the bead rings firmly to canvass plies to form an unvulcanized tire carcass to which are added the unvulcanized rubber tread and sidewalls for subsequent molding and vulcanization.

Such devices are well known and normally comprise a plurality of similar, bead lock segments which are equally arcuately spaced about the longitudinal center axis of the tire building drum, adjacent opposing ends of the outer cylindrical shell of the drum on which the unvulcanized tire carcass is built. The segments are simultaneously reciprocal in radial directions to and from the center axis of the tire building drum.

U.S. Pat. No. 4,087,306 shows and describes a typical tire building drum that employs annular, inflatable air bags for operating the bead lock segments, in unison. U.S. Pat. No. 4,007,081 discloses the use of a complex linkage system for regulating the movement of the bead lock segments. U.S. Pat. No. 3,871,942 discloses a rack and pinion drive to operate the bead lock segments and move them in radial directions to and from the center axis of the drum. The invention of this application is directed to a totally different mechanism for controlling the movement and operation of the set of bead lock segments that are at each end of the cylindrical, outer shell of a tire building drum.

Briefly stated, the invention is in a tire building drum that employs adjacent each of its opposing ends, a set of bead lock segments with bead seats that are in circumferential alignment around the center axis of the drum. Means are provided for slidably mounting the segments of each set, for reciprocating movement along fixed radial raceways or pathways to and from the center axis of the drum. A scroll member is mounted adjacent each set of bead lock members for rotation in either direction about the center axis of the drum. Means are supplied to operatively connect the scroll members and adjacent bead lock segments, so that the segments will move, in unison and equal distances, along the radial pathways in response to rotation of the scroll member, such means including cam rollers moveable along a trackway that spirals in helical fashion around the center axis of the drum.

The spiral of the trackway is such that a minimum of effort or force is required to move the segments radially to and from the center axis of the drum.

DESCRIPTION OF THE DRAWING

The following description of the invention will be better understood by having reference to the accompanying drawing, wherein.

ENVIRONMENT OF THE INVENTION

Figure 1:
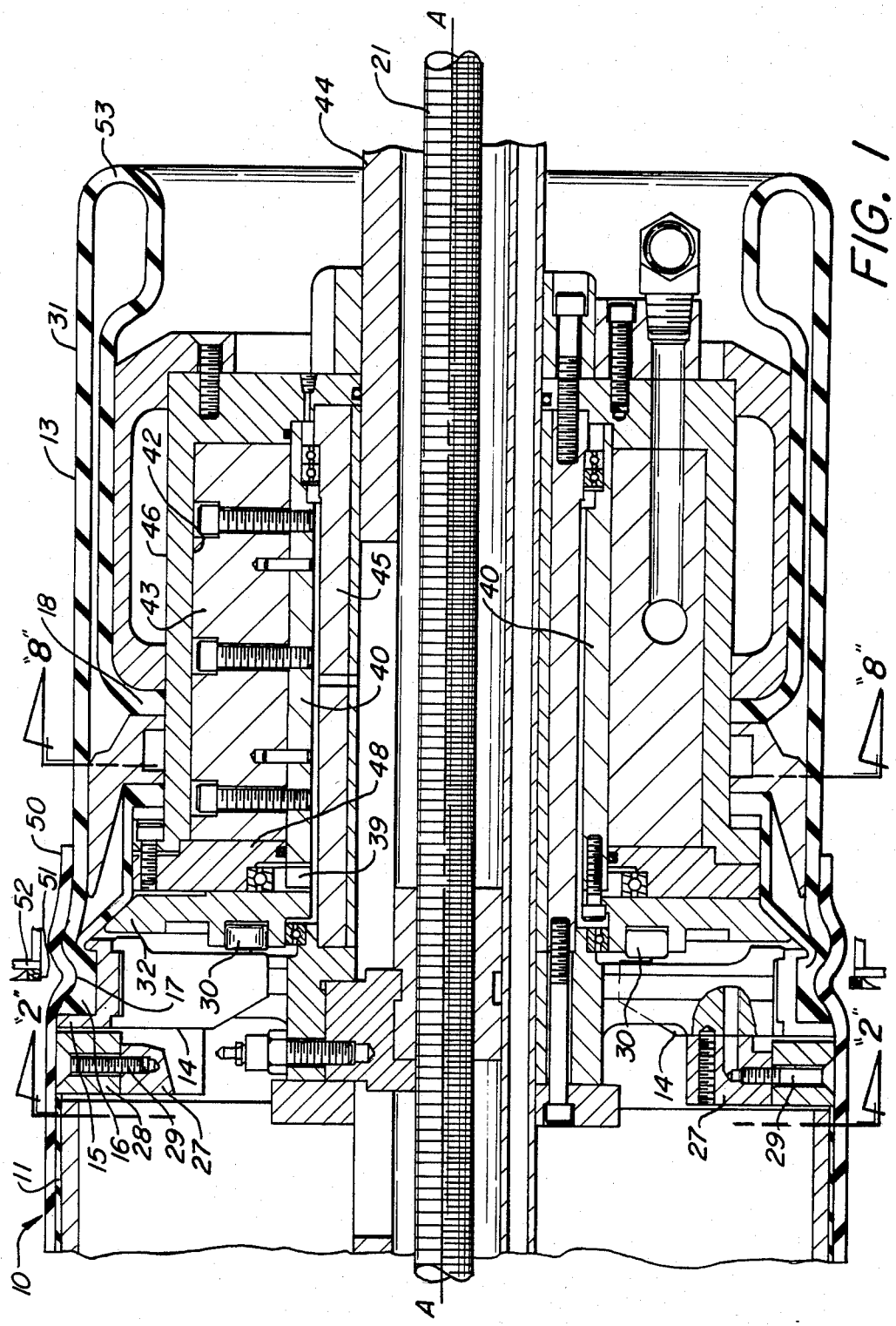
FIG. 1 is generally a mirror image section of one-half of a tire building drum that is made is accordance with the invention, the section being generally viewed from the line 1—1 of FIG. 8 and shown in connection with a carcass ply and surrounding tire bead ring.

With general reference to the drawing for like parts and particular reference to FIG. 1, there is shown a tire building drum 10 which has an outer, cylindrical shell or surface 11 on which is layered, for example, a single carcass ply 12 which is composed of any suitable tire cord fabric that is calendered with unvulcanized rubber material. The shell 11 is concentric about the center axis A-A of the drum 10 and is divided longitudinally, in half, by the centerplane C-P of the drum 10.

A generally annular turn-up bladder 13 is positioned adjacent each of the opposing ends of the shell 11 outwardly in farthest spaced relation from the centerplane of the drum than the ends of the shell 11. The turn-up bladders 13 are inflatable with air, under pressure, and are composed of any suitable elastomeric material which can be reinforced with any appropriate reinforcement cords or fabric, if desired.

A plurality of similar, bead lock members or segments 14 (FIG. 2) are positioned between each of the opposing ends of the shell 11 and the adjacent, outwardly spaced turn-up bladders 13. The two sets of bead lock segments 14 at the opposing ends of the shell 11, as well as their method of operation, is the same. Therefore, the following explanation will be in relation to the set of bead lock segments shown in FIGS. 1 and 2. Each of the bead lock segments 14 has a removable cap 15 of any suitable design. In this case, the caps 15 are designed as clamps for holding the annual inboard end 16, i.e. the end closest the centerplane of the drum 10, of the adjacent turn-up bladder 13. The inboard end 16 of each turn-up bladder 13 is enlarged and specially designed with a continuous depression 17 that curves inwardly towards the center axis of the drum 10 and acts as a bead seat which will be more fully explained later. Each of the turn-up bladders 13 also has an enlarged, annular outboard end 18 which is clamped to the drum 10 in spaced relation outwardly of the bead lock segments 14, relative to the centerplane of the drum 10.

THE INVENTION

Figure 2:
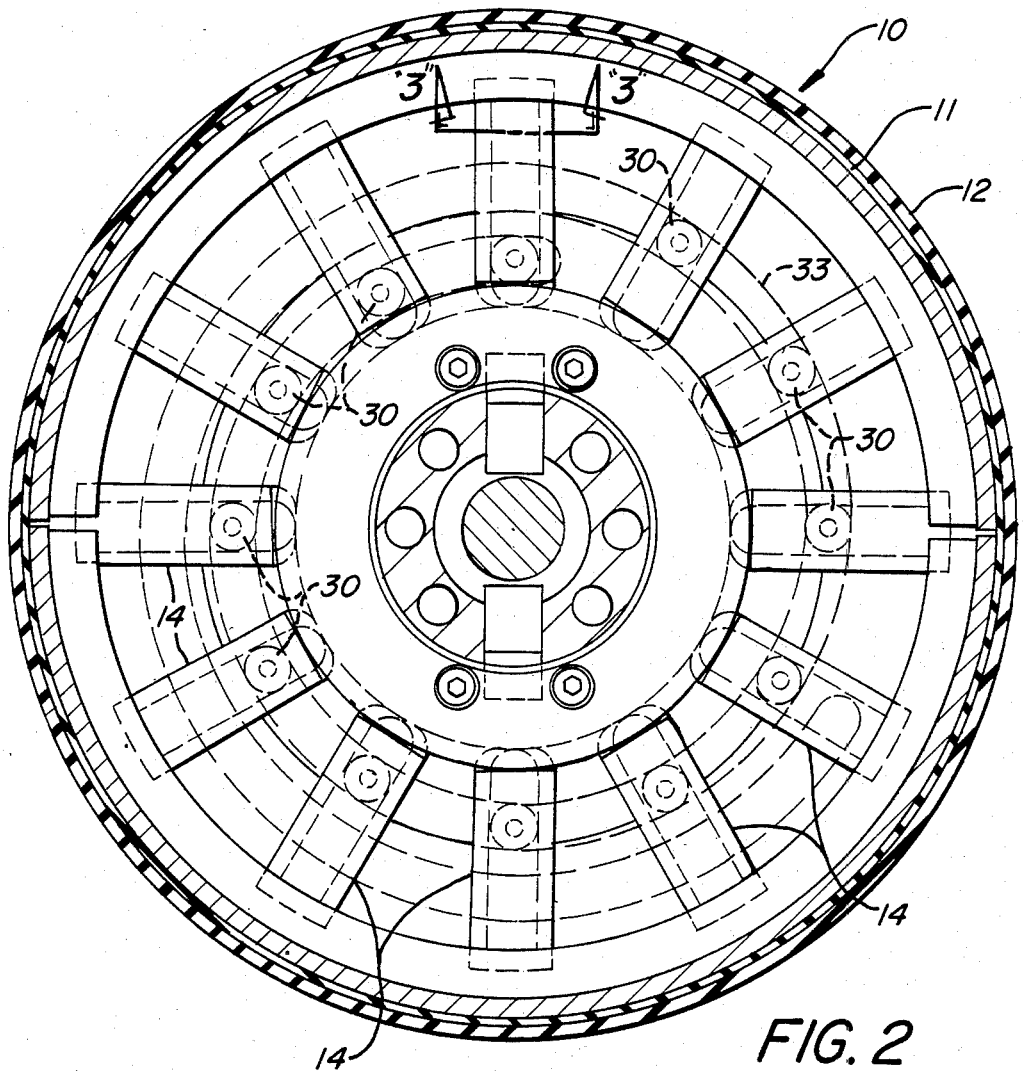
FIG. 2 is a section of the drum viewed from the line 2—2 of FIG. 1.
Figure 3:
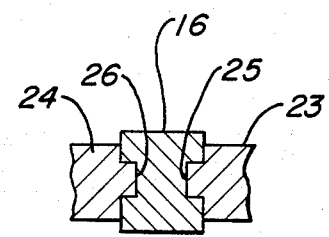
FIG. 3 is a section of one of the bead lock segments and adjacent raceway.
Figure 4:
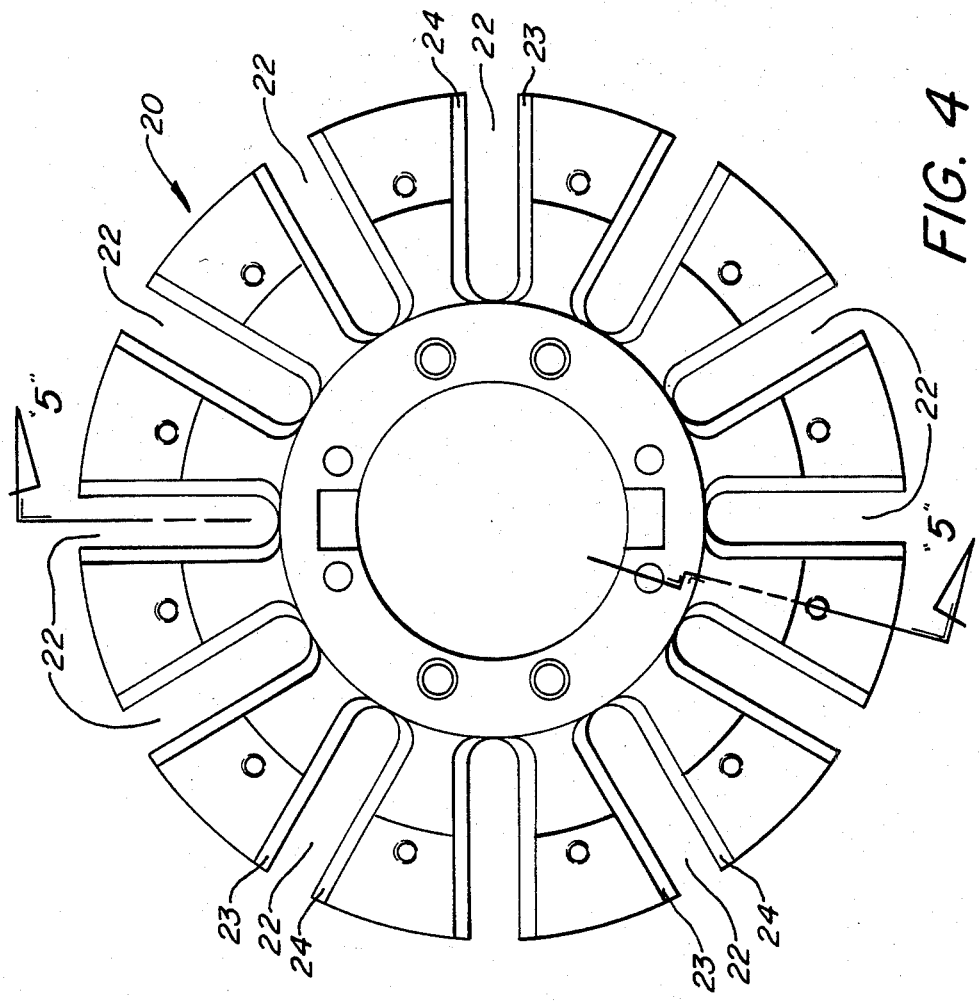
FIG. 4 is a plan view of a member for supporting a set of bead lock segments.
Figure 5:
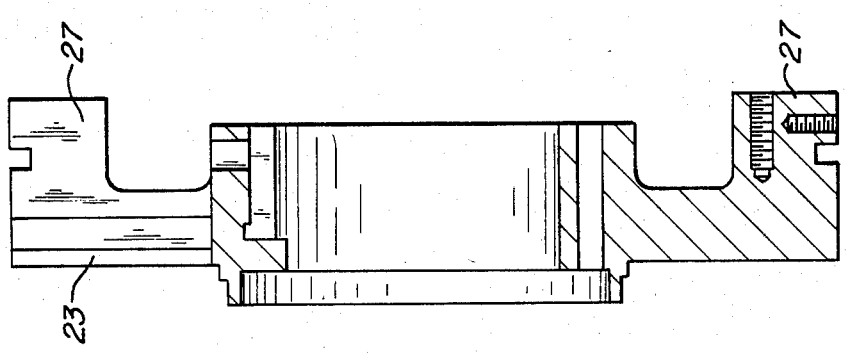
FIG. 5 is a section of the support member viewed from the line 5—5 of FIG. 4.

An annular, generally planer member 20 (FIGS. 4, 5) is provided for slidably supporting each set of bead lock segments 14. The support members 20 are concentrically disposed about the center axis of the drum 10, and are in parallel planes which are normal to the center axis. The support members 20 are coupled to the drive shaft 21 of the drum 10, as best seen in FIG. 1. The support members 20 do not rotate, i.e. they do not rotate unless the drum 10 rotates. However, they do move axially or longitudinally of the drum 10 in response to rotation of the drive shaft 21. Each of the support members 20 has a plurality of similar raceways which are radially oriented in relation to the center axis of the drum 10. Each of the raceways 22 is formed between a pair of confronting, parallel, inverted T-shaped slides or runners 23, 24 (FIG. 3) which are designed to be received in matingly shaped slots or recesses 25, 26 that are longitudinally disposed in adjacent faces of each of the bead lock segments 14. Thus, the bead lock segments 14 are free to slide along their fixed radial pathways formed by the raceways 22. In this instance, the support members 20 each have an annular projection 27 to which the annular rings 28, secured at the opposing ends of the outer shell 11, are fastened by any suitable means, e.g. bolts 29. A cam roller 30 is mounted for rotating freely on each of the lock bead segments 14. The cam rollers 30 are mounted on successive angularly spaced bead lock segments 14 in predetermined varying radial distances from the center axis of the drum 10, as best seen in FIG. 2, when the segments 14 are in their retracted positions of FIG. 1, where the segments 14 are closer to the center axis of the drum 10 than when they are in their fully extended positions where the bead seats 17 carried by the segments 14 are spaced outwardly from the center axis of the drum a radial distance which is greater than that of the outer shell 11 of the drum 10 and the generally aligned outer exposed surfaces 31 of the turn-up bladders 13, when uninflated. The cam rollers 30 face outwardly away from the centerplane of the drum 10.

Figure 6:
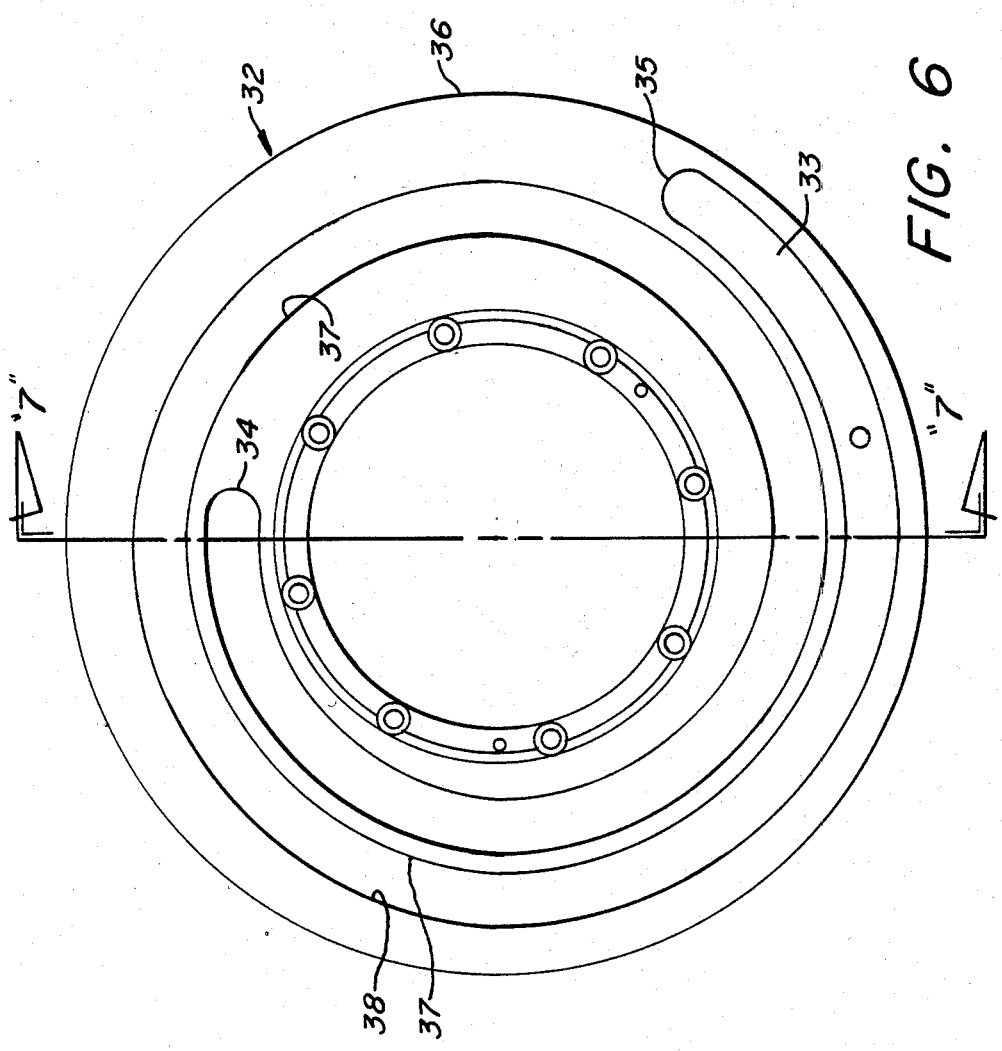
FIG. 6 is a plan view of a scroll member and shows the spirally oriented trackway.
Figure 7:
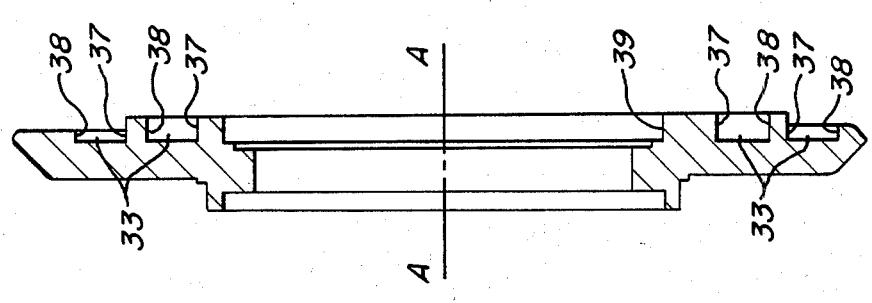
FIG. 7 is a section of the scroll member viewed from the line 7—7 of FIG. 6.

An annular scroll member 32 (FIGS. 6, 7) is positioned in side-by-side, parallel relation to each of the support members 20. The scroll members 32 are spaced outwardly of the support member 20 a distance, measured axially of the drum 10 from the centerplane thereof, which is greater than the correspondingly measured distance of the support members 20. The scroll members 32 are also concentrically disposed about the center axis of the drum 10 and are generally planar, in shape. A trackway 33, in the form of a groove which is recessed inwardly of the scroll members 32, is disposed in spiraling or helixical relation around the center axis of the drum 10. Each trackway 33, from the inside end 34 closer the center axis of the drum 10, to the outside end 35, closer the outer periphery 36 of the scroll member 32, passes almost one and three-quarters times around the center axis of the drum 10, or through an arc of about 600 degrees, to form a gently sloping ramp which the cam rollers 30 rollingly engage as they travel along the adjacent trackways 33. It can now be appreciated from FIG. 2, why the cam rollers 30 of succeeding bead lock segments 14 are in decreasing or increasing radial distances from the center axis of the drum, depending on the helixical shape and location of the grooved trackway 33 on the scroll 32; namely, so that the bead lock segments 14 are maintained in equal radial distances from the center axis of the drum while being in registry with the grooved trackways 33.

Each of the trackways 33 includes an inner sidewall 37, closer the center axis of the drum 10, and an opposing outer sidewall 38. If the scroll 32 of FIG. 6 rotates, for example, in a clockwise direction, the cam rollers 30 will rollingly engage the inner sidewalls 37 of the grooved trackways 33. The spiralling inner sidewalls 37 act as an inclined ramp or wedge to force the bead lock segments 14, outwardly from the center axis of the drum 10 to their extended positions. When the scroll 32 rotates in the opposite, counter clock wise direction, the outer sidewalls 38 act in reverse to wedge or force the segments 14 inwardly back to their retracted positions of FIG. 1. Because of the gentle slope of the inner and outer sidewalls 37, 38, if projected in linear relation, it takes a relatively small force to rotate the scrolls 32 which, in turn, develop a relatively large outward thrust or force against the cam rollers 30 and attached segments 14. The radial distance from the center axis of the scroll 32 to the inner sidewall 37 of each trackway 33 increases by about 0.2–0.26 inches for every 90 degree of arc. The width of the grooved trackways 33, measured in a radial direction, is slightly larger than the overall diameter of the cam roller 30.

Figure 8:
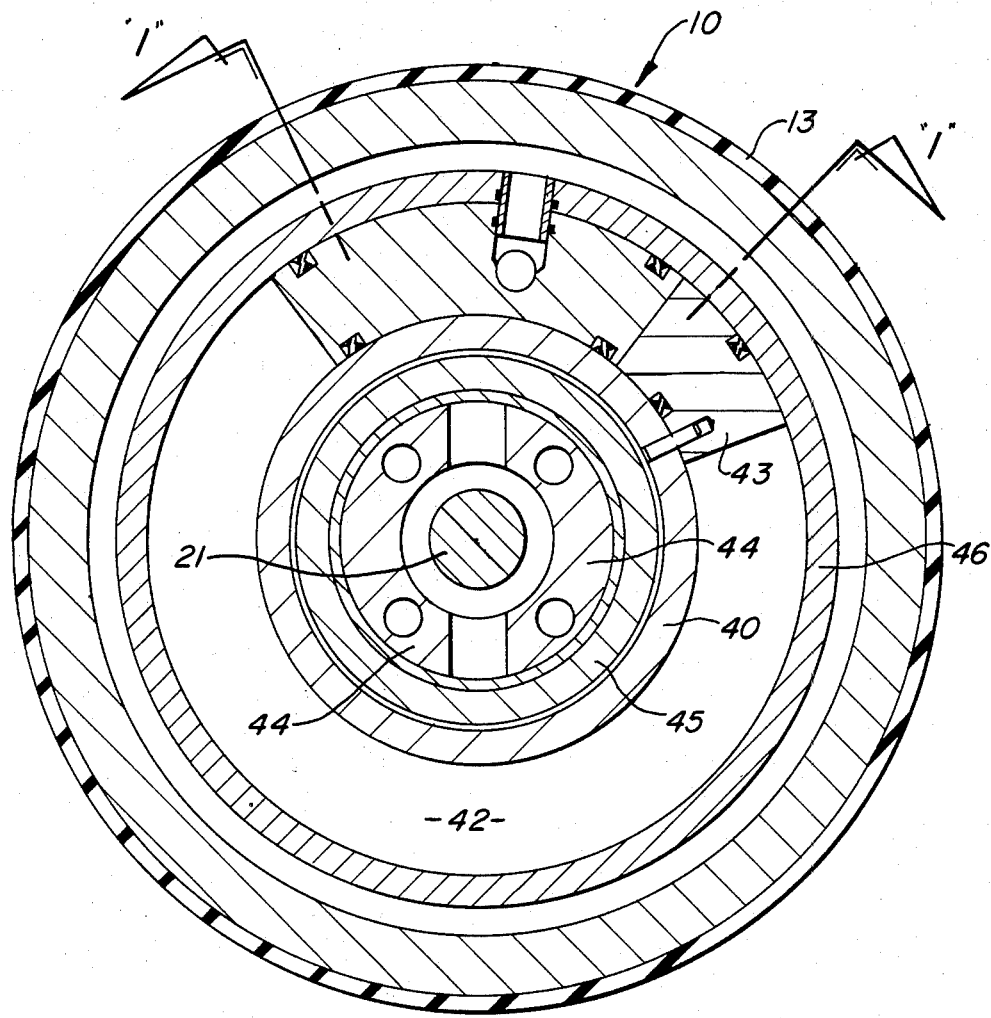
FIG. 8 is a section of the drum viewed approximately from the line 8—8 of FIG. 1, designed to show the mechanism for operating the bead lock segments via the scroll member.

The scrolls 32 each have a cylindrical offset 39 which is secured to an outwardly extending, inner cylindrical wall 40 of an annular housing 41 that has a generally rectangular cross-section, as best seen in FIG. 1. The housing 41 is hollow and defines an annular bore 42 which is concentric with the center axis of the drum 10 and in which an arcuate-shaped segment or piston 43 (FIG. 8) is reciprocative. The inner cylindrical wall 40 of the housing 41 and the piston 43 are bolted together for unitary rotation. Thus, each scroll 32 and attached inner cylindrical wall 40 of the adjacent housing 41 and associated piston 43 rotate together, in unison.

It can be appreciated from a study of FIG. 1, that the assembly of the support member 20 and slidably attached bead lock segments 14, the scroll 32, the piston housing 41, and the turn-up bladder 13, is designed to rotate with the main shaft 44 of the tire building drum 10. Nevertheless, the support member 20, relative to the adjacent scroll 32, is stationary, whereas the scroll 32, relative to the adjacent support member 20, is rotatable. This is essentially accomplished by means of a generally cylindrical main frame 45 which concentrically surrounds, and is movable longitudinally along, the main drum shaft 44, but which is secured to the adjacent bead lock support member 20 and the outer cylinder wall 46 of the piston housing 41 via the opposing connecting end walls 47, 48 which the inner wall 40 of the housing 41 rotatably abuts. Any suitable sealing means can be employed between the aforementioned stationary and movable components.

Assuming that the carcass ply 12 is properly positioned on the outer shell 11 of the drum 10, so that the opposing ends of the carcass ply 12, i.e. the ply endings 50, extend outwardly beyond the bead seats 17 and rest on the adjacent turn-up bladder 13, a pair of annular bead rings 51 are positioned around the drum 10 in parallel relation and in radially aligned relation with the bead seats 17 by any suitable means, e.g. a pair of bead setting devices or rings 52, a portion of which is shown in FIG. 1. Air is circulated, under pressure, to the annular bores 42 to act upon the vanes or pistons 43 to rotate them, in unison, for example, in a clockwise direction (FIG. 8), whereby the attached scrolls 32 (FIG. 6) are likewise rotated to uniformly move the bead lock segments 14 to their fully extended positions, where the bead seats 17 and covering carcass ply 11 compressively engage the adjacent inner surfaces of the tire bead rings 51. The bead setting rings 52 are moved outwardly from the centerplane of the drum beyond the most outboard reverse beads 53 of the turn-up bladders 13, so that the bladders can be inflated to turn-up and reversely wrap the ply endings 50 around the tire bead rings 51. When the turn-up bladders 13 are near or fully inflated, the bead setting rings 52 are, again, moved inwardly to engage and push the inflated bladders 13 into a rollover position where the bladders 13 press the ply endings 50 back against the adjacent portions of the carcass ply 11 to complete the turn-up process, after which the double acting pistons 43 are deactivated to rotate the scrolls 32 back to their normal rest positions to consequently move the bead lock segments 14 back to their retracted positions of FIG. 1.

Thus, there has been described a simple, yet effective, mechanized apparatus for reciprocating two sets of bead lock segments between two operating positions on a tire building drum. The grooved trackways are given the best possible slope to maximize the output of force in relation to a minimum input of force, all of which is naturally dependent upon the size and shape of the scroll in which the grooved trackways are formed.

What is claimed is:

1. A tire building drum, comprising:
   (a) an outer cylindrical shell on which at least one carcass ply of unvulcanized rubbery material can be layered, the shell having a longitudinal center axis and a centerplane which divides the shell in half longitudinally, the shell having a pair of opposing ends;
   (b) a set of bead lock members adjacent each of the opposing ends of the shell, each set of bead lock members being concentrically, disposed about the center axis of the shell and including a plurality of bead lock members which are angularly spaced about the center axis of the shell and which are reciprocative, in unison, in radial directions to and from the center axis of the shell;
   (c) a scroll member disposed concentrically about the center axis of the shell in side-by-side relationship with each set of bead lock members and rotatable about the center axis of the shell;
   (d) means for rotating the scroll members, in unison, about the center axis of the shell in either rotary direction; and
   (e) means coacting between each scroll member and each set of bead lock members for moving the bead lock members radially in response to rotation of the scroll member.

2. The tire building drum of claim 1, which includes:
   (f) means for mounting the bead lock members of each set for movement along fixed radial pathways relative to the center axis of the shell.

3. The tire building drum of claim 2, wherein the means for moving the bead lock members radially in response to rotation of the scroll members, includes:
   (g) a grooved trackway recessed inwardly of each of the scroll members and spirally oriented around the center axis of the shell, and
   (h) a cam roller mounted on each of the bead lock members for rotating freely about an axis which is parallel to the center axis of the shell, the cam rollers projecting from each set of bead lock members into the grooved trackway of the adjacent scroll member.

4. The tire building drum of claim 3, wherein the means for rotating the scroll members includes:
   (i) a hollow annular housing disposed adjacent each of the scroll members and defining an annular bore which is concentric about the center axis of the shell;
   (j) a piston reciprocative in the annular bore;
   (k) means for reciprocating the piston in the bore; and
   (l) means for coupling the pistons and adjacent scroll members together for unitary rotation.

5. The tire building drum of claim 4, wherein the means for coupling the pistons and the adjacent scroll members together includes:
   (m) an inner cylindrical wall of the housing surrounding the center axis of the shell and closer thereto than the outer cylindrical wall of the housing;
   (n) means for mounting the inner cylindrical wall of each housing for rotation about the center axis of the shell;
   (o) means for securing the inner cylindrical wall of each housing between the piston in the housing and the adjacent scroll member.

6. The tire building drum of claim 5, wherein the mounting means (f) for the bead lock members of each set includes a support for each set of bead lock members, the supports being in side-by-side parallel relation with the scroll members and spaced inwardly thereof in closer spaced relation to the centerplane of the shell, each of the supports including a plurality of raceways which are equally angularly spaced about the center axis of the shell, each of the raceways defined between a pair of confronting, inverted T-shaped runners which are relatively slidably received in adjacent slots which are recessed inwardly and longitudinally of each of the bead lock members.

7. The tire building drum of claim 6, wherein the cam rollers of succeeding bead lock members of each set of angularly spaced members, are spaced varying radial distances from the center axis of the shell, so that the segments remain equally radially spaced from the center axis of the shell, as the cam rollers move in registry with, and along, the trackways.

8. The tire building of claim 7, which includes a separate cap which is removable mounted on the free end of each of the bead lock members farthest from the center axis of the shell.

9. A tire building drum, comprising:
   (a) an outer cylindrical shell on which at least one carcass ply of unvulcanized rubbery material is layered, the shell having a longitudinal center axis, and a centerplane which divides the shell in half longitudinally, and a pair of opposing ends;
   (b) an annular inflatable turn-up bladder disposed concentrically about the center axis of the shell adjacent each of the opposing ends of the shell;
   (c) a set of bead lock segments disposed concentrically about the center axis of the shell adjacent each of the opposing ends of the shell inwardly of the adjacent turn-up bladders closer the centerplane of the shell, each set of bead lock segments including:
   (I) an annular, generally planar support member disposed concentrically around the center axis of the shell and having a number of open-ended raceways which are equally, angularly spaced about the center axis of the shell and which extend radially from said axis, the end of each raceway farthest from said axis being open, each of the raceways being defined between a pair of confronting, inverted T-shaped runners which extend longitudinally of the raceways;
   (II) a bead lock segment in each of the raceways and having a pair of longitudinally extending slots which extend inwardly of the segments from opposing force thereof and which confront the runners, for slidably receiving the runners, and (III) a cam roller mounted on each of the segments intermediate opposing radially spaced ends of the segments for rotating freely about an axis which parallels the center axis of the shell, the cam rollers projecting outwardly from the plane of the support members in directions away from the centerplane of the shell;

(d) an annular, general planar scroll member disposed concentrically around the center axis of the shell in side-by-side parallel relation with each of the support members and spaced outwardly of the support members farther from the centerplane of the shell, each of the scroll members including a grooved trackway which extends inwardly of the scroll members in spirally relation at least once around the center axis of the shell, and which confronts the adjacent support member for receiving the cam rollers carried by the segments adjacent thereto;

(e) a hollow annular housing disposed concentrically around the center axis of the shell adjacent each of the scroll members and spaced outwardly therefrom farther from the centerplane of the shell, the housing having an inner cylindrical wall closer to the center axis of the shell than an outer cylindrical wall which is radially spaced from the inner wall, and a pair of opposing end walls between the inner and outer walls, the walls of the housing defining therein, an annular bore which extends at least partially around the center axis of the shell;

(f) a piston reciprocative in the bore of each housing;

(g) means for mounting the piston and inner wall of each housing together for unitary rotary movement about the center axis of the shell;

(h) means for mounting the inner wall of each housing and the adjacent scroll member together for unitary rotary movement about the center axis of the shell; and (i) means for mounting the outer and end walls of each housing and adjacent support member together for relative stationary, non-rotary movement in relation to the adjacent rotary scroll member.

10. The tire building drum of claim 9, wherein the grooved trackway extends at least one and one-half times around the center axis of the shell.

11. The tire building drum of claim 10, wherein each bead lock segment includes at the free end thereof farthest from the center axis of the shell, a bead seat which includes a curved depression for receiving a tire bead ring positioned around the shell in radial alignment with the bead seats, when the segments are moved outwardly from the center axis of the shell.

12. The tire building drum of claim 11, which includes:

(j) a drive shaft which extends longitudinally of the shell and is concentric therewith; and (k) means for mounting an assembly of a support member and the adjacent scroll member and housing on the drive shaft for unitary axial movement along the drive shaft in response to rotation of the drive shaft.

13. The tire building drum of claim 11, which includes a cap at the outer free end of each segment, and means for detachably mounting the caps to the segments.

14. The tire building drum of claim 11, which includes:

(l) means for securing the opposing ends of the shell to the adjacent support member.

15. The tire building drum of claim 14, which includes:

(m) means for reciprocating the pistons, in unison, within their respective bores to simultaneously move the segments along their fixed raceways.

16. The tire building drum of claim 11, wherein the cam rollers are located on the segments in varying distances from the center axis of the shell in corresponding relation to their positions along the grooved trackways, such that the segments remain equally radially spread from said axis as the cam rollers move along the trackway in registry with the trackway.

* * * * *